United States Patent [19]

Burton et al.

[11] 4,370,461

[45] Jan. 25, 1983

[54] ORGANO PHOSPHORUS-CONTAINING COMPOUNDS AS CATALYSTS FOR DEBLOCKING BLOCKED ISOCYANATES

[75] Inventors: Bruce L. Burton, Lake Jackson, Tex.; George A. Doorakian, Bedford, Mass.

[73] Assignee: The Dow Chemical Company, Midland, Mich.

[21] Appl. No.: 286,925

[22] Filed: Jul. 27, 1981

[51] Int. Cl.$^3$ .................. C08G 18/14; C08G 18/80
[52] U.S. Cl. ............................................... 528/45
[58] Field of Search ..................................... 528/45

[56] References Cited

U.S. PATENT DOCUMENTS 3,668,186  6/1972  Duncan et al. .................. 528/45
3,705,119  12/1972  Levy et al. .................... 260/33.2 R
4,150,211  4/1979  Müller et al. .................... 528/45
4,152,309  5/1979  Ijichi et al. .................... 528/45

FOREIGN PATENT DOCUMENTS 1326669  8/1973  United Kingdom .

OTHER PUBLICATIONS

Zeno W. Wicks, Jr.; Blocked Isocyanates; Progress in Organic Coatings, 3 (1975), pp. 73–99.

*Primary Examiner*—Maurice J. Welsh
*Attorney, Agent, or Firm*—J. G. Carter

[57] ABSTRACT

Blocked isocyanates are deblocked by heating in the presence of an organo phosphorus-containing compound.

19 Claims, No Drawings

ORGANO PHOSPHORUS-CONTAINING COMPOUNDS AS CATALYSTS FOR DEBLOCKING BLOCKED ISOCYANATES

BACKGROUND OF THE INVENTION

Blocked isocyanates have been employed in coating applications wherein the blocked isocyanates and a polyhydroxyl-containing compound are formulated together to form one package coatings. Upon heating, the blocked isocyanate deblocks thereby forming —NCO groups which can then react with an —OH group or any other group reactive with an isocyanate group such as primary or secondary amine groups.

Catalysts are often employed to facilitate the deblocking reaction. Wicks, Jr. in "Blocked Isocyanates", *PROGRESS IN ORGANIC COATINGS*, 3 (1975), pp 73–99, discloses such suitable deblocking catalysts as tertiary amines, ammonium compounds, organometal compounds and metal halides of such metals as tin, zinc, bismuth, titanium, magnesium, calcium, strontium or barium.

The present invention concerns a new group of catalysts, organo phosphorus compounds, for deblocking blocked isocyanates.

In some instances, these phosphorus-containing catalysts result in deblocking the blocked isocyanate at a lower temperature or in less time at a comparable temperature.

SUMMARY OF THE INVENTION

One aspect of the present invention concerns a process for deblocking blocked isocyanates which process comprises heating a composition containing a blocked isocyanate in the presence of an organo phosphorus-containing compound at a temperature and time for said deblocking to occur.

Another aspect of the present invention is a composition comprising
(A) at least one compound having an average of more than one blocked isocyanate group;
(B) at least one compound having an average of more than one active hydrogen atom reactive with an —NCO group; and
(C) a catalytic quantity of an organo phosphorus-containing compound.

DETAILED DESCRIPTION OF THE INVENTION

Suitable phosphonium catalysts which can be employed herein include, for example, those compounds having at least one phosphonium cation group represented by the formula

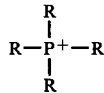

wherein each R is independently a hydrocarbyl or substituted hydrocarbyl group having from 1 to about 20, preferably from 1 to about 6, carbon atoms or substituted hydrocarbyl groups. It is preferred that at least one, preferably two and most preferably three, of the R groups be an aromatic group i.e., an aryl group or an alkaryl group such that the phosphorus atom is attached directly to the aromatic ring of such aryl or alkaryl group.

By the term hydrocarbyl, it is meant that the groups can be alkyl, aryl, alkaryl, aralkyl and the alkyl can be either cyclic or acylic. By substituted hydrocarbyl it is meant that the hydrocarbyl groups can contain one or more substituent groups such as, for example, —OH, —SH, Cl, Br, I, $NO_2$, mixtures thereof and the like.

The R groups can contain any substituent group which will not deactivate the catalyst under the conditions in which they are employed.

Suitable anions which form the remainder of the phosphonium compound include both nucleophilic and non-nucleophic types, e.g., the halides, such as, for example, Cl, Br, I, F, carboxylates, dicarboxylates, phosphates, nitrates, sulfates, nitrites, sulfites, borates, chromates, phenates, bicarbonates, hexafluorophosphate, mixtures thereof and the like.

Most of the above are more fully described in the following patents:
Canadian 893,191 (to Perry, issued Feb. 15, 1971);
U.S. Pat. No. 3,477,994 (to Dante et al, issued Nov. 11, 1969);
U.S. Pat. No. 3,948,855 (to Perry, issued April 6, 1976);
U.S. Pat. No. 4,093,650 (to Doorakian et al, issued June 6, 1978);
U.S. Pat. No. 4,132,706 (to Doorakian et al, issued Jan. 2, 1979);
U.S. Pat. No. 4,171,490 (to Doorakian et al, issued Oct. 16, 1979);
U.S. Pat. No. 4,177,216 (to Doorakian et al, issued Dec. 4, 1979);

All of the above are incorporated herein by reference.

Particularly suitable phosphonium bicarbonate catalysts include those represented by the formula

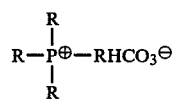

wherein each R is independently hydrocarbyl or inertly-substituted hydrocarbyl radicals, having from 1 to about 20 carbon atoms. The term hydrocarbyl designates a univalent hydrocarbon radical. This hydrocarbyl group can operably bear substituents which will not deactivate the catalyst such as, for example, alkyl, aryl, alkoxy, hydroxyalkyl moieties and the like.

The above phosphonium bicarbonates are conveniently prepared by reacting at room temperature a tetrahydrocarbyl phosphonium halide dissolved in a lower alkanol with an ion-exchange resin (quaternary ammonium hydroxide type), to thereby produce a solution containing the corresponding tetrahydrocarbyl phosphonium hydroxide salt. Carbon dioxide at a positive pressure is then brought into intimate contact with the alkanolic solution of the phosphonium hydroxide salt at room temperature so as to produce the tetrahydrocarbyl phosphonium bicarbonate salt. This salt can be readily recovered by distillation at reduced pressure to remove the solvent.

Particularly suitable phosphonium phenate catalysts include those represented by the formula

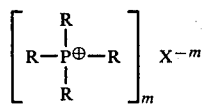

wherein each R is independently a hydrocarbyl or inertly-substituted hydrocarbyl, X is a phenate anion, and m is the valence of the anion X.

The term phenate as used herein denotes a conjugate base of an aromatic carbocyclic compound bearing at least one nuclear hydroxyl group. The tetrahydrocarbyl phosphonium phenate salts include those salts complexed with one or more moles of an aromatic carbocyclic hydroxyl compound $H_mX$, wherein X and m are defined as above. These salts also include salts complexed with one or more moles of a tetrahydrocarbyl phosphonium hydroxide salt.

Suitable phosphines which can be employed herein include, for example, those represented by the formula

wherein each R is independently a hydrocarbyl group having from 1 to about 20, preferably from 1 to about 8, carbon atoms. The hydrocarbyl groups can be aliphatic or aromatic or substituted aliphatic or substituted aromatic with alkyl being preferred. Particularly suitable phosphines include, for example, trimethyl phosphine, triethyl phosphine, tri-n-propyl phosphine, tri-n-butyl phosphine, triphenyl phosphine, tris-2-cyanoethylphosphine, tri-n-octylphosphine, tris-hydroxymethylphosphine, mixtures thereof and the like.

The quantity of catalyst is, of course, dependent upon the particular blocked isocyanate employed and the temperature and time employed in deblocking. However, such quantities can be determined experimentally by placing various quantities of the catalysts with a mixture of the blocked isocyanate and a crosslinkable material and measuring the gel time at various temperatures. From this data, the optimum amount for the particular blocked isocyanate is readily obtained.

The blocked isocyanates are the adducts of —NCO-containing compounds and phenolic hydroxyl or secondary amine-containing compounds. They may each respectively contain one or a plurality of such —NCO or phenolic hydroxyl or secondary amine groups with the adducts formed from those —NCO-containing compounds having an average of more than one —NCO group per molecule and those phenolic hydroxyl-containing compounds having an average of more than one phenolic hydroxyl group per molecule being most preferred.

Suitable blocked isocyanates also include those prepared by reacting an organic diisocyanate with a dihydric phenol in a ratio which provides about two —NCO groups per phenolic hydroxy group. These blocked isocyanates are particularly useful in preparing self-curing epoxy resins by reacting the blocked isocyanate with an epoxy alcohol in a ratio which provides about one —NCO group per hydroxyl group. Alternately, a diisocyanate can be reacted with an epoxy alcohol in a ratio which provides two —NCO groups per hydroxyl group followed by reacting this product with a dihydric phenol in a ratio which provides one —NCO group per phenol hydroxy group. These are described in British Patent 1,326,669.

Particularly suitable blocked isocyanates include those represented by the formula

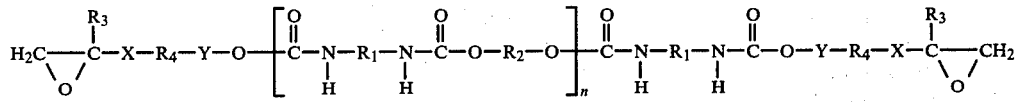

wherein $R_1$ represents the residue, after removal of two —NCO groups, of a diisocyanate and is inert towards epoxy groups, $R_2$ represents the residue, after removal of two —OH groups, of a dihydric phenol and is inert towards isocyanate and epoxy groups, $R_3$, $R_4$, X and Y represent radicals which are inert towards isocyanate and epoxy groups and X and Y can also represent valence bonds, and n is greater than 0. Preferably n is less than 5. Also suitable are the corresponding isothiocyanates.

Other particularly suitable blocked isocyanates or isothiocyanates include those represented by the formula

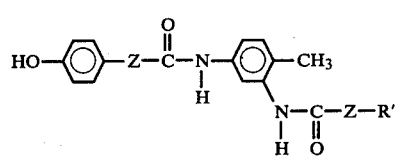

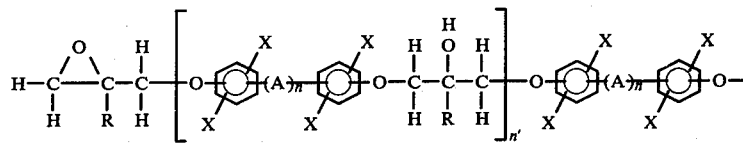

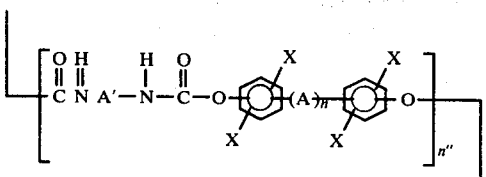

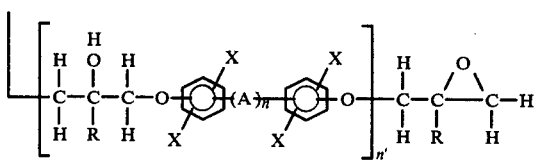

wherein each A is independently a divalent hydrocarbon group having from 1 to about 20 carbon atoms,

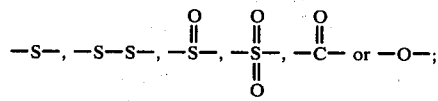

each A' is independently the residue of an organic diisocyanate with the —NCO groups removed therefrom; each R is independently hydrogen or a hydrocarbon group having from 1 to about 4 carbon atoms; each X is independently hydrogen, a hydrocarbon group having from 1 to about 6 carbon atoms, chlorine or bromine; each R' is independently a hydrocarbyl or substituted hydrocarbyl group having from about 1 to about 10, preferably from about 1 to about 4, carbon atoms whereas the substituent groups are chlorine, bromine, iodine, alkanol having 1 to about 10 carbon atoms and the like; Z is oxygen or sulfur; each n is independently zero or 1; each n' independently has an average value of from about zero to about 8, preferably from about 0.01 to about 3; and n" has an average value of from 1 to about 20, preferably from about 1 to about 5.

Suitable materials having an average of more than one —NCO group per molecule which can be employed to prepare the compositions of the present invention include, for example, those represented by the formulas

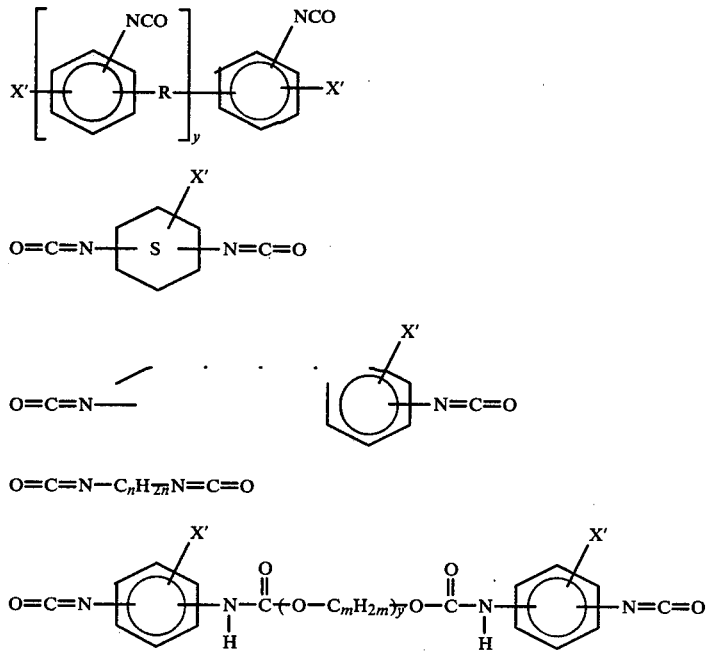

wherein each X' is independently hydrogen, chlorine, bromine or an alkyl group having from 1 to about 20 carbon atoms; each n has a value of from about 2 to about 12 carbon atoms; each m independently has a value of from two to about 4 carbon atoms; y has an average value of from about 0.01 to about 4; y' has an average value of from 1 to about 50; and R is a hydrocarbon group having from 1 to about 10 carbon atoms.

Particularly suitable materials having an average of more than one —NCO group includes, for example, toluene diisocyanate, particularly an 80/20 mixture of the 2,4-/2,6-isomers respectively, methylene diphenyl diisocyanate, polymethylene polyphenylisocyanate, hexamethylene diisocyanate, isophorone diisocyanate, mixtures thereof and the like.

Suitable materials having an average of more than one phenolic hydroxyl group or thiol group which can be employed to prepare the compositions of the present invention include, for example, those represented by the formulas

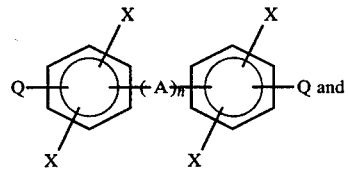

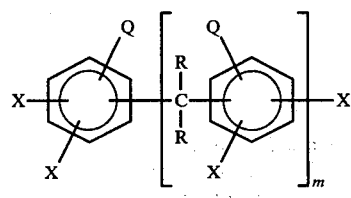

wherein each X is independently hydrogen, chlorine, bromine or an alkyl group having from 1 to about 20 carbon atoms; A is a divalent hydrocarbon group having from 1 to about 8 carbon atoms

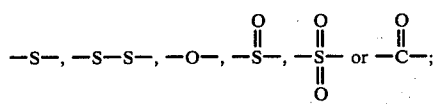

each Q is independently —OH or —SH; n has a value of zero or 1 and m has an average value of from 1.01 to about 3.

Particularly suitable phenolic hydroxyl or phenolic thiol containing materials include, for example, resorcinol, p-mercaptophenol, catechol, hydroquinone, bisphenol S, bisphenol A, tetrabromobisphenol A, phenol formaldehyde resins having an average of from about 2 to about 3 phenolic hydroxyl groups per molecule.

Suitable compounds containing more than one secondary amine group per molecule include, for example, piperazine and those represented by the formulas

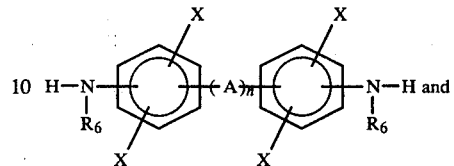

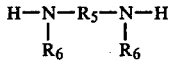

wherein A, X and n are as previously defined and $R_5$ is a hydrocarbyl group having from one to about 20, preferably from about 3 to about 10, groups and each $R_6$ is independently a hydrocarbyl group having from about 1 to about 20, preferably from about 1 to about 10, carbon atoms.

The compositions of the present invention are useful in the preparation of coating and reaction injection molding applications wherein they are modified so as to contain, or be blended with, epoxy resins, epoxy resin curing agents, accelerators and optionally pigments, flow control agents, diluents, mold release agents, dyes and the like.

Particularly suitable epoxy resins are those having an average of more than one glycidyl ether group per molecule.

Suitable materials having an average of more than one glycidyl ether group per molecule which can be employed herein include, for example, those represented by the formulas

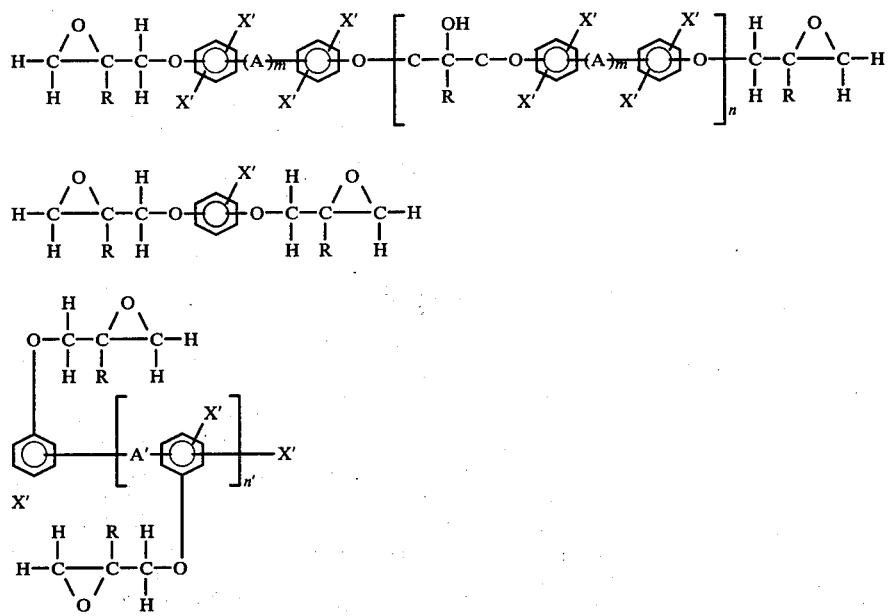

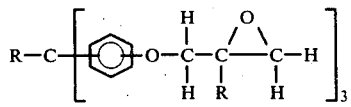

wherein each A is independently a divalent hydrocarbon group having from 1 to about 20, preferably from about 1 to about 8, carbon atoms; each A' is independently a hydrocarbon group having from 1 to about 6 carbon atoms; each X' is independently hydrogen, chlorine, bromine or a hydrocarbon group having from 1 to about 20, preferably from about 1 to about 8, carbon atoms; each R is independently hydrogen or a hydrocarbon group having from 1 to about 4 carbon atoms; each m independently has a value of zero or one; n has an average value of from about zero to about 8; and n' has an average value of from about 0.01 to about 6.

Particularly suitable glycidyl ether materials which can be employed include, for example, the digylcidy ethers of resorcinol, catechol, hydroquinone, bisphenol A, tetrabromobisphenol A, the phenol formaldehyde novolac resins having an average of from about 2 to about 7 phenolic hydroxyl groups per molecule, mixtures thereof and the like.

The compositions of the present invention can also be employed in the preparation of urethane foams, urethane coatings and the like.

The following examples are illustrative of the present invention, but are not to be construed as to limiting the scope thereof in any manner.

EXAMPLE 1 and COMPARATIVE EXPERIMENTS A & B

Into each of three sample jars was placed 12.55 grams of a 75% acetone solution of a diglycidyl ether of bisphenol A epoxy resin having an average epoxide equivalent weight of about 780 and mixed with 5.75 g of an adduct prepared by reacting 2.1 moles of 2-ethyl hexanol with 1 mole of toluene diisocyanate at 60° C. until no infra-red spectraband at 2280 cm$^{-1}$ was observed. Into one of these jars was mixed 0.19 g (5.9×10$^{-4}$ moles) of tetra-n-butyl phosphonium bicarbonate (TBPBC). Into another was mixed 0.18 g (4.2 10$^{-4}$ moles) of dibutyl tin dilaurate (DBTDL). No catalyst was mixed with the third jar. Each of the three formulations were applied to panels at a draw down thickness of about 2 mils. These coated panels were then subjected to temperatures of 150° C. and 175° C. and the time for the coating to gel was recorded. The results are given in Table I.

EXAMPLE 2 and COMPARATIVE EXPERIMENTS C & D

A hydroxyl functional resin was obtained by reacting two moles of a diglycidyl ether of bisphenol A epoxy resin having an average epoxide equivalent weight of about 530 with four moles nonylphenol until no evidence of epoxy groups were observed by titration with tetraethylammonium bromide. To 126.88 g of 65% acetone solution of this hydroxyl functional resin was mixed 35 g of N,N"-(4-methyl-1,3-phenylene)bis(N',N'-dibutyl urea) prepared from di-n-butylamine and 80/20 2,4-/2,6-toluene-diisocyanate in a molar ratio of about 2 to 1 respectively. To each of three sample jars was added 50 grams of this mixture. To one of the jars was added 0.5 g (1.2×10$^{-3}$ moles) of stannous octoate (Sn Oct). To another was added 0.5 g (2.5×10$^{-3}$ moles) of tri-n-butyl phosphine (TBP). No catalyst was added to the third. Coatings were prepared and the gel times at 175° C. was observed as in Example 1. In some instances duplicate samples were tested as indicated by the results. The results are given in Table I.

EXAMPLE 3 and COMPARATIVE EXPERIMENT E

To 12.55 g of a 75% acetone solution of the epoxy resin employed in Example 1 was added and mixed in each of two sample jars 8.22 g of a blocked isocyanate (prepared by reacting 375 g (1.70 moles) of nonylphenol and 141.6 g (0.81 moles) of an 80/20 mixture of 2,4-/2,6-toluene diisocyanate in the presence of 0.5 g of dibutyl tin dilaurate until no infra-red peak at 2280 cm$^{-1}$ was observed) followed by the addition and mixing of 0.21 g (1.0×10$^{-3}$ moles) of tri-n-butyl phosphine in one sample jar and no catalyst in the other. Duplicate or triplicate samples were made and tested as in Example 1 at 120° C. and 135° C. The results are given in Table I.

TABLE I

| EXAMPLE OR COMPARATIVE EXPERIMENT NO. | TEMP. °C. | GEL TIME SEC. |
| --- | --- | --- |
| 1[a] | 150 | 248 |
|  | 175 | 96 |
| A[b] | 150 | >800 |
|  | 175 | 277 |
| B[c] | 150 | >800 |
|  | 175 | >800 |
| 2[d] | 175 | 148 |
|  | 175 | 154 |
| C[e] | 175 | 454 |
|  | 175 | 430 |
| D[c] | 175 | >600 |
| 3[e] | 120 | 62 |
|  | 120 | 64 |
|  | 120 | 59 |
|  | 135 | 25 |
|  | 135 | 24 |
| E[c] | 120 | 671 |
|  | 120 | 632 |
|  | 135 | 224 |
|  | 135 | 228 |

Footnotes to Table I
[a]TBPBC catalyst
[b]DBTDL catalyst
[c]No catalyst
[d]Sn Oct catalyst
[e]TBP catalyst

EXAMPLE 4

In three separate flasks, 0.05 moles of 2,4-toluene dimethyl carbamate was added to 25.0 ml of dry diethylene glycol dimethyl ether which contained 0.10 mole of 1,3-diphenoxy-2-propanol. The reaction mixtures were heated to 140° C. in two hours and in the presence of three different phosphonium salts; 1.31 g (0.005 mole) of methyl tri-n-butyl phosphonium formate, 1.39 g (0.005 mole) of methyl tri-n-butyl phosphonium bicarbonate and 3.73 g (0.005 mole) tetra n-butyl phosphonium bisphenate. After five hours of heating, the products were analyzed by infra-red and N.M.R. The ether insoluble product was that represented by the formula

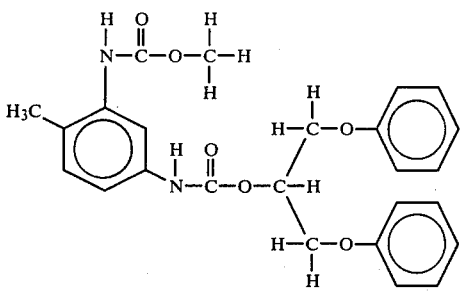

A 90% yield was observed for the bicarbonate catalyst, an 81% yield for the bisphenate and 70% for the formate catalyst. The control experiment with no catalyst produced only a 1.7% yield of the product.

We claim:

1. A process for deblocking blocked isocyanates which process comprises heating a composition containing a blocked isocyanate in the presence of, as a deblocking catalyst, an organo phosphorus-containing compound selected from phosphonium compounds and phosphines at a temperature and time for said deblocking to occur.

2. A process for deblocking isocyanates which process comprises heating a composition containing a blocked isocyanate in the presence of, as a deblocking catalyst, an organo phosphorus-containing compound wherein the blocked isocyanate (I) is prepared from (A) at least one compound having an average of more than one —NCO group per molecule and (B) at least one compound having an average of more than one group selected from phenolic hydroxyl, phenolic thiol or secondary amine groups per molecule which groups may be the same or different;

(II) is a reaction product of (A) at least one epoxy resin having an average of more than one vicinal epoxy group per molecule; with (B) a reaction product of (1) at least one compound having an average of more than one —NCO group per molecule; with (2) at least one compound having an average of more than one phenolic hydroxyl group per molecule in quantities which provide more than one phenolic hydroxyl group; wherein components (A) and (B) are employed in quantities such that the amount of epoxy groups is in excess of the number of phenolic hydroxyl groups;

III has been prepared by reacting (A) an —NCO terminated reaction product of (1) at least one organic diisocyanate with (2) at least one dihydric phenol in a ratio which provides at least 2 —NCO groups for each phenolic hydroxyl group with (B) an epoxy alcohol; until essentially no —NCO groups remain;

IV has been prepared by reacting (A) a reaction product of (1) at least one epoxy alcohol with (2) at least one organic diisocyanate in proportions which provide about one —NCO group per —OH group and (B) a dihydric phenol in a proportion which provides about one phenolic hydroxy group per —NCO group; until essentially no —NCO groups remain; or (V) is a mixture thereof.

3. The process of claim 1 wherein said blocked isocyanate is a reaction product of (A) at least one epoxy resin having an average of more than one vicinal epoxy group per molecule; with (B) a reaction product of (1) at least one compound having an average of more than one —NCO group per molecule; with (2) at least one compound having an average of more than one phenolic hydroxyl group per molecule in quantities which provide more than one phenolic hydroxyl group for each —NCO group; and wherein components (A) and (B) are employed in quantities such that the amount of epoxy groups is in excess of the number of phenolic hydroxyl groups.

4. The process of claim 3 wherein in component (B) the ratio of the number of phenolic hydroxyl groups to the number of —NCO groups is about 2:1 and wherein the ratio of the number of epoxy groups present in component (A) to the number of phenolic hydroxyl groups remaining in component (B) is about 2:1.

5. The process of claim 1 wherein said blocked isocyanate is one which has been prepared by reacting (A) an —NCO terminated reaction product of (1) at least one organic diisocyanate with (2) at least one dihydric phenol in a ratio which provides at least 2 —NCO groups for each phenolic hydroxyl group with (B) an epoxy alcohol; until essentially no —NCO groups remain.

6. The process of claim 1 wherein said blocked isocyanate has been prepared by reacting (A) a reaction product of (1) at least one epoxy alcohol with (2) at least one organic diisocyanate in proportions which provide about one —NCO group per —OH group and (B) a dihydric phenol in a proportion which provides about one phenolic hydroxyl group per —NCO group; until essentially no —NCO groups remain.

7. A process of claims 2, 3, 4, 5 or 6 wherein (a) any of said epoxy resins is a diglycidyl ether of bisphenol A, tetrabromobisphenol A or mixture thereof, having an average epoxide equivalent weight of from about 177 to about 975; (b) any of said phenolic hydroxyl-containing compounds or dihydric phenols is bisphenol A, tetrabromobisphenol A or mixture thereof; (c) any said epoxy alcohol is glycidol; and (d) any of said compounds having an average of more than one —NCO group per molecule or organic diisocyanate is 2,4-toluene diisocyanate, 2,6-toluene diisocyanate, methylene di(phenylisocyanate) or mixture of any two or more of such isocyanates.

8. A process of claims 1, 2, 3, 4, 5 or 6 wherein said deblocking catalyst is a phosphonium salt wherein the cation is a tetrahydrocarbylphosphonium wherein the hydrocarbyl groups each independently contain from about 1 to about 20 carbon atoms and the anion is Cl, Br, I, F, a carboxylate, a dicarboxylate, a carboxylate.carboxylic acid complex, a phosphate, a nitrate, a sulfate, a nitrite, a sulfite, a borate, a hexafluorophosphate, a chromate, a phenate, a bicarbonate, a bisphenate, or mixture thereof.

9. A process of claim 8 wherein (a) said hydrocarbyl groups each independently contain from about 1 to about 10 carbon atoms and (b) said anion is a bicarbonate, bisphenate or carboxylate.carboxylic acid complex.

10. A process of claim 9 wherein said cation is tetra-n-butyl or ethyl triphenyl and said anion is bicarbonate or acetate.acetic acid complex.

11. A process of claim 7 wherein said deblocking catalyst is a phosphonium compound wherein the cation is a tetrahydrocarbylphosphonium wherein the hydrocarbyl groups each independently contain from about 1 to about 20 carbon atoms and the anion is Cl, Br, I, F, a carboxylate, a dicarboxylate, a phosphate, an carboxylate.carboxylic acid complex, a nitrate, a sulfate, a nitrite, a sulfite, a borate, a chromate, a hexafluorophosphate, a phenate, a bicarbonate, a bisphenate, or mixture thereof.

12. A process of claim 11 wherein (a) said hydrocarbyl groups each independently contain from about 1 to about 8 carbon atoms and (b) said anion is a bicarbonate, a phenate or an carboxylate.carboxylic acid complex.

13. A process of claim 12 wherein said cation is tetra-n-butyl or ethyl triphenyl and said anion is bicarbonate or acetate.acetic acid complex.

14. A process of claims 1, 2, 3, 4, 5 or 6 wherein said deblocking catalyst is a trihydrocarbyl phosphine wherein each hydrocarbyl group independently has from about 1 to about 20 carbon atoms.

15. A process of claim 14 wherein each hydrocarbyl group independently has from about 1 to about 10 carbon atoms.

16. A process of claim 15 wherein said phosphine is tri-n-butyl-phosphine.

17. A process of claim 7 wherein said deblocking catalyst is a trihydrocarbyl phosphine wherein each hydrocarbyl group independently has from about 1 to about 20 carbon atoms.

18. A process of claim 17 wherein each hydrocarbyl group independently has from about 1 to about 10 carbon atoms.

19. A process of claim 18 wherein said phosphine is tri-n-butyl phosphine.

* * * * *

UNITED STATES PATENT AND TRADEMARK OFFICE
CERTIFICATE OF CORRECTION

PATENT NO. : 4,370461
DATED : January 25, 1983
INVENTOR(S) : Bruce L. Burton and George Doorakian It is certified that error appears in the above—identified patent and that said Letters Patent is hereby corrected as shown below:

Col. 2, line 5; "acylic" should be --acyclic--.

Col. 2, line 14; "non-nucleophic" should be --non-nucleophilic--.

Col. 6; the third formula following line 25 should read:

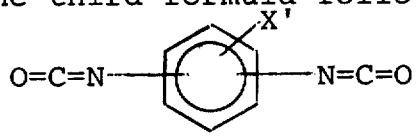

Col. 9, line 20; "digylcidy" should be --diglycidyl--.

Col. 14, Claim 16; "tri-n-butyl-phosphine" should be --tri-n-butyl phosphine--.

Signed and Sealed this

Twenty-eighth Day of June 1983

[SEAL]

Attest:

Attesting Officer

GERALD J. MOSSINGHOFF

Commissioner of Patents and Trademarks